June 28, 1932.  W. B. EWING  1,864,897

NIPPLE THREADING APPARATUS

Filed Sept. 27, 1930  4 Sheets-Sheet 3

INVENTOR
W. B. Ewing
BY
N. E. Dunlap
ATTORNEY

June 28, 1932.  W. B. EWING  1,864,897
NIPPLE THREADING APPARATUS
Filed Sept. 27, 1930  4 Sheets-Sheet 4

INVENTOR
BY W. B. Ewing
N. E. Dunlap
ATTORNEY

Patented June 28, 1932

1,864,897

UNITED STATES PATENT OFFICE

WYLIE B. EWING, OF WHEELING, WEST VIRGINIA

NIPPLE THREADING APPARATUS

Application filed September 27, 1930. Serial No. 484,800.

This invention relates broadly to threading apparatus, and more specifically to a nipple threading mechanism.

The primary object of the invention is to provide a semi-automatic machine for cutting exterior screw threads on the ends of short lengths of tubing for producing nipples of the character commonly employed for connecting or coupling the ends of pipes, pipe fittings and the like.

A further object is to provide a machine of the character mentioned whereby not only may the thread cutting operation be performed in a convenient and expeditious manner, but also the ends of said nipples may be reamed out to remove the burrs produced in cutting to length the nipple stock.

With these and other objects in view, the invention resides in the features of construction, arrangement of parts and combinations of elements which will hereinafter be fully described, reference being had to the accompanying drawings, in which—

Figure 1:
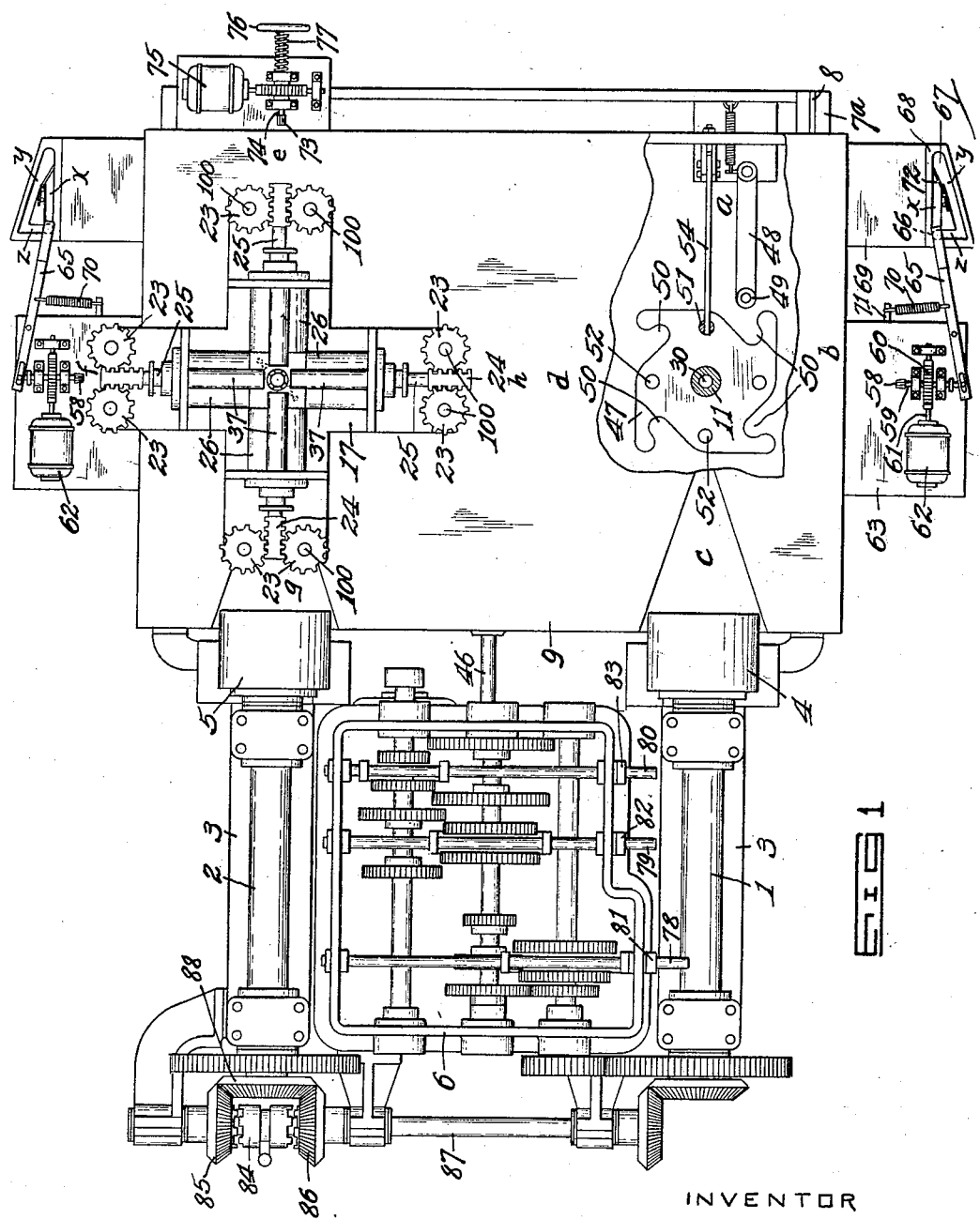
Figure 1 is a view partially in top plan and partially in section, illustrating the invention, the top or cover of the gear case being shown removed.
Figure 2:
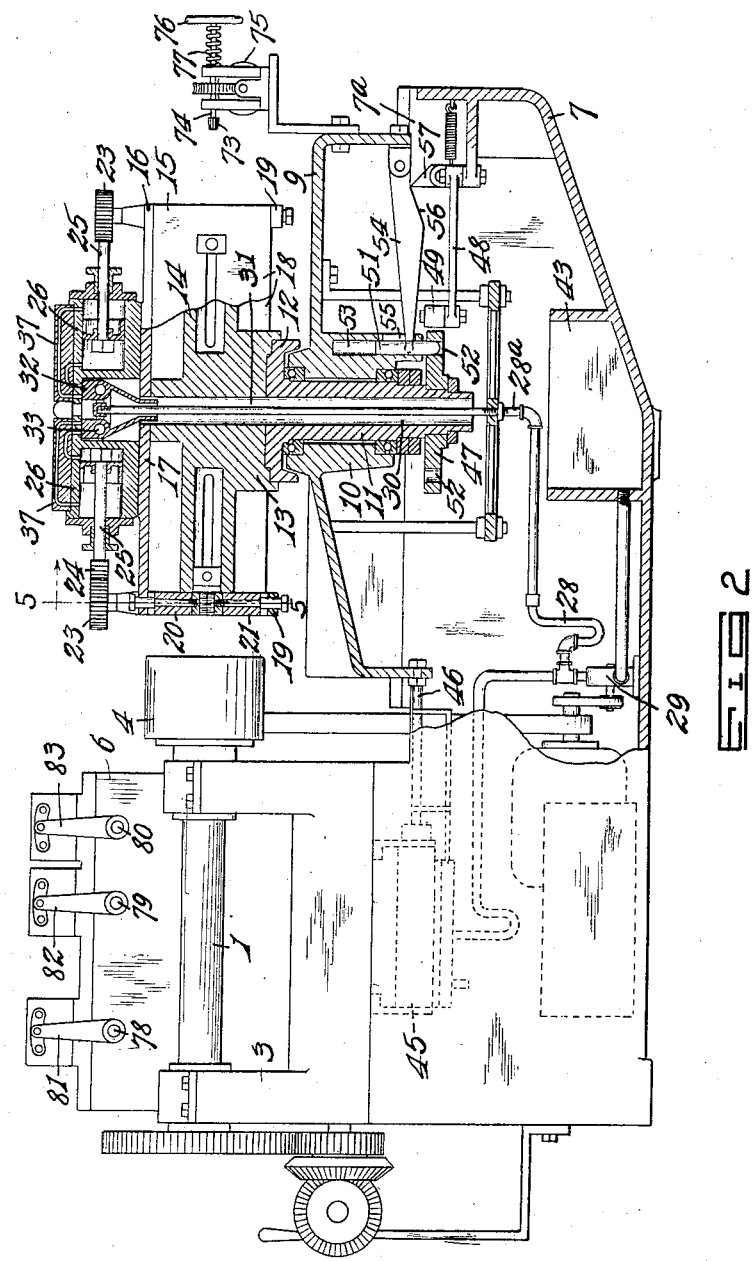
Figure 2 is a view of the same partly in side elevation and partly in vertical section.
Figure 3:
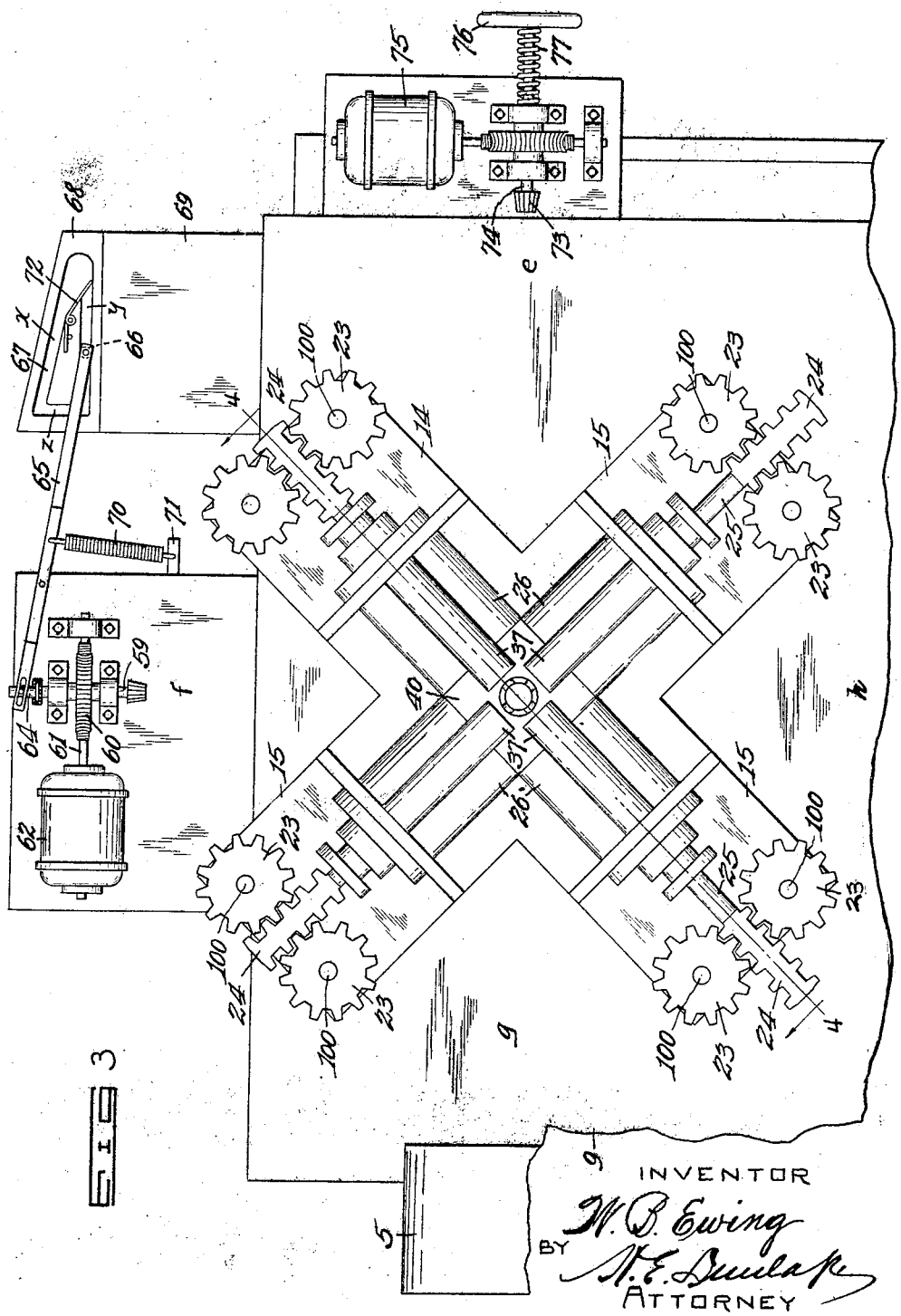
Figure 3 is an enlarged top plan view of a turret head.

Referring to said drawings, 1 and 2 designate two shafts journaled in parallel and suitably spaced relation upon a frame or frames, as 3. Fixed upon the inner ends of the rotary shafts 1 and 2 are die heads 4 and 5, respectively, of any suitable type embodying adjustable thread-cutting chasers (not shown). Said shafts have associated therewith and are driven, as by an electric motor, through appropriate change-speed transmission gearing mounted within a gear case 6 which is herein shown as located between said shafts.

Located in front of and on a suitably lower level than said die heads is a suitable supporting structure 7 embodying walls 7ª which have formed therein or thereon guideways 8 upon which a table 9 is mounted for reciprocatory travel. Said table embodies two vertically disposed hub portions 10 arranged in transversely alined spaced relation, and journaled for rotary movements within each of said hubs is a vertically disposed hollow stem 11 having a head 12 on its upper end. Rigidly mounted upon said head 12 is the base member or portion 13 of a turret head casting 14 which carries a plurality of relative spaced radial arms generally designated by the reference numeral 15, four such arms arranged in 90 degree relation being herein shown. Each of said arms is of substantially rectangular hollow-casing form in cross section, having its top formed by an arm-like portion 16 of a cap plate 17 of cross shape which is centrally mounted on the top of said turret head casting 14. Each arm 15 also includes opposite side members 18 which are connected at their outer ends by an underlying attached anchor bar 19.

Figure 5:
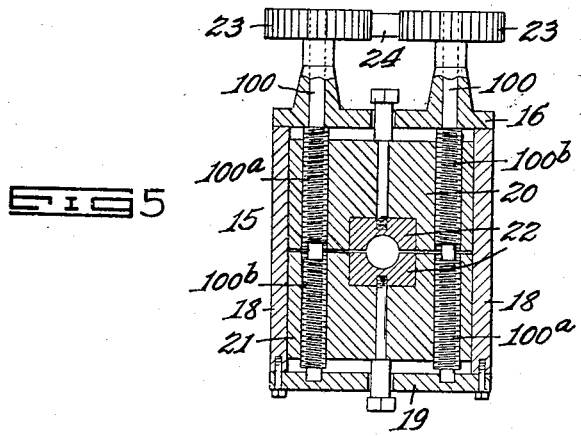
Figure 5 is an enlarged section on line 5—5, Fig. 2, showing the vise jaws and the therewith associated actuating means.
Figure 4:
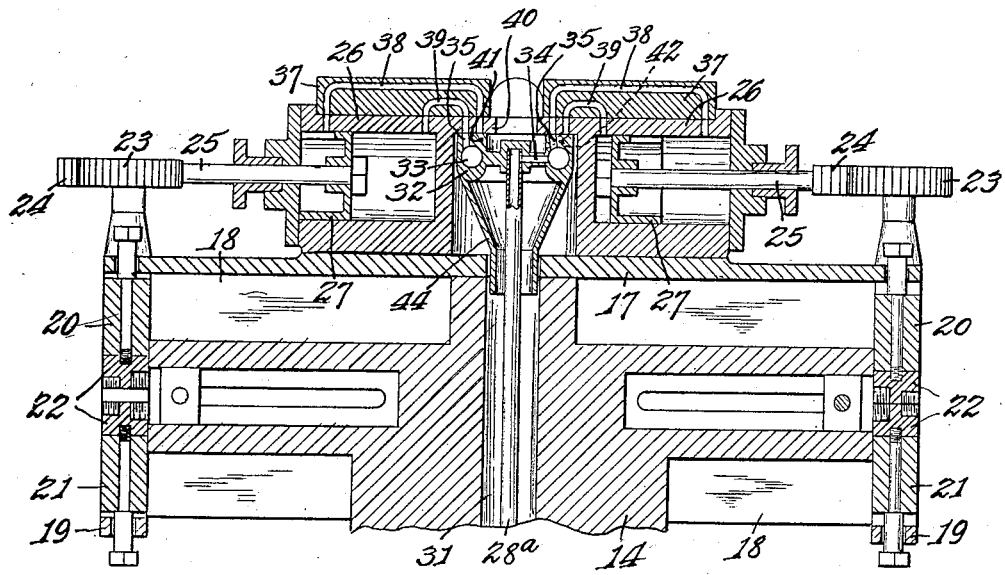
Figure 4 is a section of the turret head taken on line 4—4, Fig. 3; and—

Fitted within the outer end of each of said arms 15 and occupying superposed relation is a pair of relatively shiftable vise blocks 20 and 21 adapted for having removably mounted in the adjacent face portions thereof jaws 22 which may be interchanged as required to suit different sizes of work pieces to be gripped thereby. Journaled in the arm-like portion 16 and the anchor bars 19 of each arm 15 are the opposite end portions of vertically disposed threaded shafts 100 upon which said vise blocks 20 and 21 are relatively shiftable, said shafts having portions 100ª and 100ᵇ carrying oppositely directed threads engaged with correspondingly threaded alined bores provided therefor in said blocks, as is most clearly shown in Fig. 5. Said shafts 100 have fixed on their projecting upper ends small gears 23 which are relatively spaced and which have operatively engaged therewith the teeth of an intermediate horizontally disposed rack-bar 24, a corresponding row of the teeth being formed on each of the opposite sides of said bar.

Each rack-bar 24 includes, or is formed on the outer end of, a rod 25 which is longitudinally shiftable through an end of an adjacent power cylinder 26 mounted on the turret head, or upon the body of the cap plate 17, and which carries upon its end a reciprocable piston 27 adapted to be actuated by a pressure fluid, as steam or compressed oil or air, admitted to and exhausted from said cylinder at definite times or at definitely timed intervals, as will hereinafter be explained.

While said operating fluid may be conducted to and returned from the various cylinders 26 by any appropriate means, I have herein shown a pressure line including pipes 28 and 28ᵃ leading from a pressure pump 29 and through the alined axial hollows or bores 30 and 31 of the headed stem 11 and the turret head 14, said pipe 28 being provided in the form of a flexible tube. Fixed upon the upper end of said supply pipe 28ᵃ is a distributor head 32 of spider form having therein a circularly disposed fluid passage 33 which is in open communication with said pipe through a radially directed passage or port 34 provided in one of the spider arms of said distributor head.

Opening outward through the top face of said distributor head at diametrically opposite points are fluid inlet ports 35 and 36 leading from the circular fluid passage 33 of said head, and provided in the top wall of each of the cylinders 26, or partially in said wall and partially in a block-like member 37 which surmounts each of said cylinders, are two fluid passages 38 and 39, each of which alternately serves as an inlet passage and as an exhaust passage. The passages 38 of the various cylinders 26 have their outer ends opening into the outer ends of said cylinders and their opposite ends opening vertically through inwardly directed extension walls 40 of the cylinders in positions wherein, in the rotation of the turret head, they are successively and at definite times presented in direct communication with the port 35 of the distributor head 32.

The passages 39 have their outer ends opening into the inner ends of the cylinders and their inner ends so positioned that they are successively and at definite times presented in communication with the port 36 of said distributor head. Further, said passages 38 and 39, which, as hereinbefore stated, alternately serve as inlet and exhaust passages, are successively brought into communication with exhaust ports 41 and 42 which lead through the distributor head and discharge inwardly between the spider arms thereof so that the exhaust fluid, if oil is employed, may drain downwardly to a suitably located receptacle, as 43, through the funnel-like apron 44 which depends from said distributor head and through the bores 31 and 30 of the turret head 14 and the stem 11.

The turret heads are intermittently rotated, the travel in each rotary movement thereof being throughout one-fourth revolution for successively presenting the vise jaws 22 in axially alined relation to the thereto-adjacent die head.

The table 9 carrying said turret heads is shifted at regular intervals, as by means of a power cylinder 45 having a reciprocable piston whose rod 46 is attached to the rear side of said table. In each outward movement of said table, an intermittent gear 47 fixed on the lower end of the stem 11 of the turret is carried to a position wherein it is engaged and rotated throughout one-fourth of a revolution by an arm 48 which has one end pivotally mounted on a stationary part of the supporting structure 7. The opposite end of said arm carries an anti-friction roller 49 which, in outward movement of the table, is received in the thereto adjacent pocket 50 of said intermittent gear 47 and imparts to said gear the required rotary movement.

As shown, said gear 47 has four such pockets provided in its peripheral edge. At the end of said movement, an anchor pin 51 drops into one of four relatively spaced holes 52 provided therefor in said gear and secures said gear and, consequently, the turret in fixed position. As herein shown, said anchor pin is vertically movable within a socket 53 provided therefor in the lower end of the hub 10 of the table 9 and is elevated and lowered on the outer end of a lever 54 which has its opposite end pivotally mounted on the under side of said table, said outer end being vertically movable in a slot 55 provided therefor in the adjacent wall of said socket. The under side of said lever 54 has an inwardly and downwardly inclined surface 56 which, in reciprocations of the table, rides back and forth on a suitable support 57 and said lever is thus actuated to rise for releasing the gear 47 just prior to each engagement of the latter with the arm 48 and to fall just prior to the end of each rotary movement of said gear.

In practice, the lengths of tubing to be threaded in the production of a nipple or the like are first entered between the then open jaws of the vises as they are successively presented in facing relation to the operator by that turret head which is located at the operator's left hand as he faces the front side of the table. Otherwise expressed, the lengths of tubing are introduced between each set of vise jaws as they are brought to rest in the position, or at the station, designated $a$ in Fig. 1 of the drawings.

At a point intermediate said station $a$ and the next station $b$, the latter located at a 90 degree angle and in clockwise direction from the former, the power piston 46 controlling the vise jaws acts to close the latter in tightly gripping relation to the inserted end of the tubing, the passages 38 and 39 of the cylinder at said point in the travel being brought into register with the ports 35 and 42 of the distributor head, thus causing the inward travel of the piston of said cylinder necessary to effect the jaw-closing movement.

At the station b, a reamer 58 is thrust into operative relation to the outer end of the length of tubing carried by said vise jaws and effects removal of the internal burr. Said reamer is carried on the inner end of a longitudinally shiftable rotary shaft 59 which has splined thereon a gear 60 located in driven relation to an underlying worm carried by the rotor shaft 61 of an adjacent motor 62. Said motor and the parts driven thereby are mounted on an extension or bracket 63 carried by the adjacent end of the table 9. Pivotally connected to an attached non-rotatable stub 64 which is connected to the outer end of said shaft 59 and relative to which the latter is rotatable, is one end of a lever 65 which is pivoted intermediate its end on said bracket 63 and which carries on its opposite end a roller 66. Said roller is disposed for travel in a triangular cam slot 67 provided in a suitable part, as a block 68 mounted on an extension 69 of the frame structure. Said lever 65 is normally disposed in the position shown in Fig. 1, being so held by a spring 70 which connects it to a stationary part 71 of the bracket 63.

As the table is thrust outward in reciprocating movements thereof, the lever-carried roller 66 is moved forward therewith throughout the length of the therewith alined portion or track x of said slot 67. In said movement the roller passes beneath the free end of an inclined leaf spring 72 which is mounted on said block 68 and which constitutes a barrier or guard that serves to divert the return travel of such roller to the inclined track y of said cam slot. In said return travel of the lever 65 is swung on its pivot to the extent that it effects the required inward shifting of the reamer-carrying shaft 59 with respect to the adjacent work piece. At the limit of the return movement of the table and the thereby carried parts, the roller 66 is actuated by the spring 70 to return to its initial position through the transverse track z of said slot 67, thus retracting the reamer and its shaft.

At the next station c, with the inward movement or reciprocation of the table 9, the projecting end of the work piece is thrust within the therewith alined die head 4, the chasers of which act during the rest period of the turret to cut the required external threads on said projecting end. After passing said station c, the vise jaws holding said work piece separate so that the latter may be removed therefrom at station d.

The work-piece so removed is then transferred to the head 73 of a work holder which occupies a position at the front of the table 9 adjacent to station e. The unthreaded end of the work piece, mounted on said head 73, is firmly held by the latter as said work holder is thrust inwardly and rotated to effect threading of its previously threaded end between the correspondingly threaded vise jaws which then are located at station e in confronting relation to said work holder. Said head 73 is carried by a shaft 74 which is driven by a motor 75 through the intermediacy of interengaged worm and spur gears, the latter splined on said shaft. Swiveled on the outer end of said shaft is a hand wheel 76 by means of which the said shaft may be thrust inward by hand to present the inner end of the then revolving work piece to a position wherein its inner end is received by the threaded jaws. A spring 77 effects outward shifting of said shaft 74 and the head 73 upon release of the hand-applied inwardly directed force.

At the next station f, the projecting end of the work piece is acted upon for removing the internal burr by a second reamer mechanism which corresponds in all respects to that hereinbefore described and which has identical reference characters applied thereto in the drawings. At station g the projecting end of the work piece is presented to the chasers of the die head 5 whereby threads are cut on said end. The jaws holding said work piece open prior to reaching station h at which said work piece is removed in its finished condition.

It will be understood that the successive movements of the various parts of the mechanism and the various rest periods are made to occur in properly timed relation or sequence.

The transmission gearing is designed to provide various speed changes to adapt the mechanism for cutting the threads to produce nipples of varying sizes, the shift rods 78, 79 and 80 thereof being operable by means of suitable shift levers, as 81, 82 and 83 provided in a convenient location. Moreover, the direction of rotation of the die head 5 may be controlled at will to provide for the cutting either of right hand or left hand threads, a clutch 84 being shiftable into operative driving relation to either of two bevel drive pinions 85 and 86 carried by a drive shaft 87 and engaged with a bevel gear 88 carried by the shaft 2 upon which said die head 5 is mounted.

What is claimed is—

1. In combination with threading means and a table reciprocable toward and away from said means, a rotary turret carried by the table, a disk-like member having teeth in its periphery connected to the turret to rotate same, an arm pivotally mounted at a fixed point at one end and having its opposite end formed to engage the teeth of said member whereby upon movement of the table toward the arm the latter will engage the teeth of said member and rotate same and thereby the turret, said member having an aperture in the upper face for each tooth, a lever pivoted at one end to the table and disposed to one side of and spaced from said arm and carrying latching means at its opposite end to engage in the apertures of said member and having a cam surface on its under side and a relatively fixed element for engagement with said cam surface to raise and lower the lever during reciprocation of the table so as to latch and unlatch the member and thereby the turret.

2. In combination with a frame having threading means thereon and a table carried by the frame and reciprocable toward and away from said means, a hub-like part carried by the table and having a vertical socket, a rotary turret journaled in said hub-like portion and having a disk-like member disposed below the latter and formed with teeth in its periphery, said toothed member having an opening in its upper face for each tooth thereof, a latching pin slidable in the socket for engagement with the respective openings of the toothed member, a lever pivoted at one end to the table and having its opposite end pivotally engaged with the pin to vertically slide same, means engageable with the teeth of said member to intermittently rotate same and thereby the turret upon movement of the table in one direction, said lever having a cam and means on the frame to engage the cam to thereby move the lever and the pin to unlatch the toothed member when the table moves in said one direction.

3. In combination with a frame having threading means thereon and a table carried by the frame and reciprocable toward and away from said means, and having a vertical socket, a rotary turret journaled in said table and having a disk-like member, said disk-like member having an opening in its upper face for each tooth thereof, a latching pin slidable in the socket for engagement with the respective openings of the toothed member, a lever pivoted at one end to the table and having its opposite end pivotally engaged with the pin to vertically slide same, means engageable with the teeth of said member to intermittently rotate same and thereby the turret upon movement of the table in one direction, said lever having a cam and means on the frame to engage the cam to thereby move the lever and the pin to unlatch the toothed member when the table moves in said one direction.

In testimony whereof, I affix my signature.

WYLIE B. EWING.